(12) United States Patent
Movlazada (10) Patent No.: US 9,328,796 B2
(45) Date of Patent: May 3, 2016

(54) CENTRIFUGAL PENDULUM MECHANISM

(71) Applicant: Schaeffler Technologies AG & Co. KG, Herzogenaurach (DE)

(72) Inventor: Parviz Movlazada, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 273 days.

(21) Appl. No.: 13/924,182

(22) Filed: Jun. 21, 2013

(65) Prior Publication Data

US 2013/0283967 A1 Oct. 31, 2013

Related U.S. Application Data

(63) Continuation of application No. PCT/DE2011/002077, filed on Dec. 5, 2011.

(30) Foreign Application Priority Data

Dec. 23, 2010 (DE) .......................... 10 2010 055 897

(51) Int. Cl.
*F16F 15/121* (2006.01)
*F16F 15/14* (2006.01)

(52) U.S. Cl.
CPC .......... *F16F 15/1214* (2013.01); *F16F 15/145* (2013.01); *Y10T 74/2128* (2015.01)

(58) Field of Classification Search
CPC ............ Y10T 74/2128; Y10T 74/2131; Y10T 74/2132; Y10T 74/2119; F16F 15/1214; F16F 15/1215; F16F 15/124; F16F 15/121; F16F 15/1335; F16F 15/1336; F16F 15/1442; F16F 15/145; F16F 15/14; F16F 15/131; F16F 15/1435; F16F 15/1421; F16F 15/1414; F16H 2045/0263
See application file for complete search history.

(56) References Cited

U.S. PATENT DOCUMENTS 1,716,496 A * 6/1929 MacAuley, Jr. .............. 74/574.2

FOREIGN PATENT DOCUMENTS

| DE | 19831160 | 1/2000 |
|---|---|---|
| DE | 102009037481 | 3/2010 |
| DE | 102009042836 | 5/2010 |

OTHER PUBLICATIONS

EPO Translation of the Description of DE 102009037481 A1, Movlazada, Mar. 25, 2010.*

* cited by examiner

*Primary Examiner* — Daniel Yabut
(74) *Attorney, Agent, or Firm* — Simpson & Simpson, PLLC (57) ABSTRACT

A centrifugal pendulum mechanism, in particular a trapezoidal centrifugal pendulum mechanism, for a damping device and/or a torque transmission device, in particular for a drive train of a motor vehicle, comprising a pendulum mass carrier, which can be rotated about a rotational axis (S) and on which a plurality of pendulum masses or pendulum mass pairs that can be moved relative to the pendulum mass carrier are provided in the circumferential direction, wherein two pendulum masses or pendulum mass pairs directly adjacent in the circumferential direction of the pendulum mass carrier are or can be mechanically coupled to each other by means of a damping element.

7 Claims, 10 Drawing Sheets

CENTRIFUGAL PENDULUM MECHANISM

CROSS-REFERENCE RELATED TO APPLICATIONS

This application is filed under 35 U.S.C. §120 and §365(c) as a continuation of International Patent Application PCT/DE2011/002077, filed Dec. 5, 2011, which application claims priority from German Patent Application No. DE 10 2010 055 897.4, filed Dec. 23, 2010, which applications are incorporated herein by reference in their entirety.

FIELD OF THE INVENTION

The present invention relates to a centrifugal pendulum device, particularly a trapeze centrifugal pendulum device for a damper device and/or a torque transmitting device, particularly for a drivetrain of a motor vehicle. Further, the invention relates to a damper device or a torque transmitting device, particularly for a drivetrain of a motor vehicle; e.g., a centrifugal pendulum, a torque converter, a clutch, a Foettinger-clutch, a clutch assembly, a damper, a torsional vibration damper, a turbine damper, a pump damper, a two-weight converter or a two-weight flywheel, or combinations thereof; with the damper device and/or the torque transmitting device comprising a centrifugal pendulum device according to the invention.

BACKGROUND OF THE INVENTION

At shafts of periodically operating machines, e.g., at a crankshaft of an internal combustion engine of a motor vehicle, during a rotary motion of the shaft interfering torsional vibrations occur, with their frequency changing with the rotation of the shaft. Particularly in the pulling operation, torsional vibrations are generated in the drive train of the motor vehicle by combustion processes of the internal combustion engine. In order to reduce these torsional vibrations, a centrifugal pendulum may be provided, which can compensate the torsional vibrations over a wider range of rotations of the internal combustion engine, ideally over its entire range of rotation. The centrifugal pendulums are based on the principle that due to centrifugal force, the pendulum weights tend to travel around a rotary axis at the largest possible distance when a rotary motion is initiated. The torsional vibrations in the shaft lead to an oscillating relative motion of the pendulum weights, with the centrifugal pendulum showing a natural frequency proportional to the rotation such that torsional vibrations can be compensated with frequencies, which are also equally proportional to the rotation of the shaft over a wide range of rotations.

A centrifugal pendulum comprises a plurality of pendulum weights, which are suspended via guide elements at a rotary pendulum weight carrier and that can perform a relative motion in reference to this pendulum weight carrier along predetermined guide paths, in order to here assume a variable distance from the axis of rotation of the pendulum weight carrier. As a consequence of the torsional vibrations in the drive train, the pendulum weights are excited to oscillate and/or vibrate, with their gravitational center permanently changing, temporarily off-set in reference to the torsional vibrations in the drive train, which causes a damping of the torsional vibrations by a mechanic feedback. An efficient damping can occur by an appropriate adjustment of the pendulum weights and their guide paths. In certain operating states of the centrifugal pendulum an impacting of the pendulum weights at the pendulum weight carrier can occur, an impacting of the faces of the pendulum weights neighboring in the circumferential direction, and/or an impacting of the guide elements in the respective longitudinal ends of the guide paths of the pendulum weight carrier and/or the pendulum weights, whereby malfunctions of the centrifugal pendulum and noise are generated, leading to a subjectively recognizable loss of driving comfort and noise.

The provision of the pendulum weights at a respective safety distance in reference to each other in the circumferential direction leads to an undesired reduction of the pendulum weights and/or the limitation of the escaping arc leads to a loss of efficiency of the centrifugal pendulum. Further, the use of rubber elements is hard to calculate with regards to tolerance under the impact of force with regards to aspects of thermal expansion and deformation. Here, reliability and lifespan of rubber elements are problematic in an oily environment. Further, rubber elements fail to prevent any impacting of pendulum weights adjacent in the circumferential direction, but they prevent it only between pendulum weights and the pendulum weight carrier. Furthermore, the terminals can only be used to a limited extent in centrifugal pendulums with a trapeze arrangement of the pendulum weights.

DE 198 31 160 A1 discloses a centrifugal pendulum for a shaft rotational about an axis with a trapeze arrangement of the pendulum weights. During operation of the centrifugal pendulum, a pendulum weight performs a purely translational motion in reference to the pendulum weight carrier of the centrifugal pendulum. This is achieved by a parallel bifilar suspension of the pendulum weights. In order for a small structural space to be well utilized, comparatively large pendulum weights are provided, with pendulum weights adjacent in the circumferential direction of the pendulum weight carrier being embodied rounded at the sides facing each other and contacting each other loosely independent from any deflection. By the facial, arc-shaped configuration of the pendulum weights, jamming pendulum weights can be essentially excluded, however here the noise development is even greater because the sides of the pendulum weights facing each other contact each other independent from any deflection of the pendulum weights, i.e., repeatedly impact each other when the operating conditions change.

BRIEF SUMMARY OF THE INVENTION

The objective of the invention is to provide an improved centrifugal pendulum device for a damper device and/or a torque transmitting device, particularly for a drivetrain of a motor vehicle. Further, an objective of the invention is to provide an improved damper device and/or an improved torque transmitting device, for example for a drivetrain of a motor vehicle. Here, the centrifugal pendulum device and/or a centrifugal pendulum equipped with the centrifugal pendulum device according to the invention shall show low noise emissions. Further, malfunctions of the centrifugal pendulum device caused by uncontrolled motions of the pendulum weights shall be reduced. Here, particularly any impacting of the pendulum weight at the pendulum weight carrier, any impacting of faces of the pendulum weights adjacent in the circumferential direction, and/or any impacting of the guide elements in the respective longitudinal ends of the guide paths of the pendulum weight carrier and/or the pendulum weights shall be reduced.

The objective of the invention is attained via a centrifugal pendulum device, particularly a trapeze centrifugal pendulum device, for a damper device and/or a torque transmitting device, particularly for a drivetrain of a motor vehicle, and via a damper device or a torque transmitting device, preferably for a drivetrain of a motor vehicle; e.g., a centrifugal pendulum, a torque converter, a clutch, a Foettinger-clutch, a clutch assembly, a damper, a torsional vibration damper, a turbine damper, a pump damper, a two-weight converter or a two-weight flywheel, or combinations thereof.

The centrifugal pendulum device according to the invention comprises a pendulum weight carrier, that can rotate about a rotary axis, at which in the circumferential direction a plurality of pendulum weights or pairs of pendulum weights are provided, which can be moved in reference to the pendulum weight carrier. According to the invention, two pendulum weights or pairs of pendulum weights directly adjacent to each other in the circumferential direction of the pendulum weight carrier are mechanically coupled to each other or can be coupled via a damper element according to the invention. Preferably the invention can be used in centrifugal pendulums with a trapeze arrangement and a controllable progression of the compensation for shock absorption and for preventing rattling noises. In the following only the respective or concerned pair and/or pairs of pendulum weights are discussed; however the following statements also apply to the respective and/or concerned (individual) pendulum weights. In such a case only a second axial section of the centrifugal pendulum device is omitted, designed symmetrical in reference to a first axial section, i.e., in case of pairs of pendulum weights the two axial sections are configured similarly or essentially identical and only separated from each other by the pendulum weight carrier. Further, the respective embodiments of the first and second variant of the damper element according to the invention described in the following can also be independent from the centrifugal pendulum device according to the invention.

In the first variant of the invention, the damper element is embodied as a spring element between the two directly adjacent, i.e., respective or concerned pairs of pendulum weights, mechanically connecting this pair of pendulum weights to each other. Here, the spring element may be embodied soft-springy between the respective pairs of pendulum weights at certain relative motions and hard-springy between the respective pairs of pendulum weights at certain other relative motions, i.e., in certain sections the spring element is embodied soft-springy and in certain sections the spring element is embodied hard-springy, whereby these sections may be provided separated from each other or each other overlapping in the spring element. The spring element according to the invention may here be provided soft-springy in the radial direction of the centrifugal pendulum device, particularly in the circumferential direction except for a spring section also soft-springy, preferably in an axial direction hard-springy and particularly preferred in the spring section also embodied hard-springy. By the spring element, elastically embodied in the radial and the circumferential direction, except for the spring section, any yielding in these directions during a vibration of the pendulum weight can occur without any relevant resistance. Any compensation of the respective pairs of pendulum weights with each other occurs, e.g., only when the respective pairs of pendulum weights collide with each other, i.e., when the spring element with a spring side essentially contacts a pair of pendulum weights entirely and the other pair of pendulum weights approaches the first one.

Preferably all pairs of pendulum weights of the pendulum weight carrier are annularly connected to an assembly via spring elements. Here the setting of the spring elements should be symmetrical, so that no shifting of the point of gravity of the pairs of the pendulum weights and tipping moments develop at the pairs of pendulum weights. In particular, by a hard-springy embodiment of the spring elements in the axial direction any impacting of the pairs of pendulum weights at the pendulum weight carrier can be effectively prevented. Further, collisions of the respective pendulum weights at maximum deflection and in the transitional phases during the operation of the centrifugal pendulum can be effectively prevented by the spring elements preferably being embodied as flat springs. In preferred embodiments of the invention the spring element is embodied as a lamella or a strip spring, which mechanically connects the respective pairs of pendulum weights to each other, whereby these pairs of pendulum weights can be provided in a mutually springy fashion depending on an opposite position. Preferably one fastening section each of the lamella spring can be fastened at a respective pair of pendulum weights, with the elastic section of the lamella spring extending between the two fastening sections between the respective pairs of pendulum weights.

In preferred embodiments of the invention a respective penetrating recess of the pendulum weight carrier, through which a pin, e.g., a rivet or a spacer rivet of the fastening section of the spring element extends, is designed such that the pin remains distanced from any boundary of the penetrating recess in essentially all possible positions during the operation of the centrifugal pendulum device and/or the centrifugal pendulum. This means, here respective clearance angles are provided which enlarge the penetrating recess such that the pin of the fastening section of the spring element cannot impact the boundary of this penetrating recess in most operating states. Further, a guide path of the pendulum weight carrier, a guide path of the respective pair of pendulum weights, and/or a respective guide element may be adjusted to each other or embodied such that in the transitional phases of the moving pairs of pendulum weights and/or a maximum pivotal angle of the centrifugal pendulum device any mutual impacting occurs almost exclusively between the pairs of pendulum weights, except for the spring elements, with further preferred a mutual impacting of these three components essentially being prevented in the essential circumferential direction.

In the exemplary embodiments of the invention, respective pairs of pendulum weights can be mechanically coupled via a single spring element at a single axial side, or via spring elements respectively on both axial sides of the pendulum weight carrier. Further, it is preferred that a fastening section of the spring element holds two axially directly adjacent pendulum weights of a pair of pendulum weights at a certain distance from each other, this may occur e.g., via the pin, the rivet, or the spacer rivet. The guide paths of the pendulum weight carrier and/or the pairs of pendulum weights may show a clearance angle to avoid collisions between the guide elements and the pendulum weight carrier (for reference see above). Preferably a maximum axial depth of the spring element or the spring section is equivalent to an axial depth of a pendulum weight, i.e., they are aligned to each other in the circumferential direction. In a transitional section from the fastening section to the spring section of the lamella spring said lamella spring may be embodied soft-springy. Further, the spring section of the lamella spring is designed essentially hard-springy over its entire extension, with the spring section at least comprising one spring path, particularly a zigzag, a curved, or a triangular path. Other forms of such a spring path may be used, of course, as long as the spring section provides a spring force between the two pairs of pendulum weights. Furthermore, the spring section of the lamella spring may show two elastic sections radially opposite each other.

In the second variant of the invention, the damper element is embodied between the two directly adjacent, i.e., respective or concerned, pairs of pendulum weights as a terminal at which the respective pairs of pendulum weights can abut and/or can collide in the circumferential direction. The terminal is preferably provided in a mobile fashion in a guide path for a guide element in the pendulum weight carrier, with in this guide path preferably also at least one pair of pendulum weights is guided with a guide element. Here, the preferably integral terminal and/or the respective guide path are sized in the pendulum weight carrier such that the terminal can be laterally inserted or adjusted therein with its longitudinal extension. In a lateral connection thereat, the pendulum weights are inserted and fastened to each other, preferably riveted, whereby in each possible position of the pendulum weights in reference to each other the terminals cannot fall out; this means the respective guide path in the pendulum weight carrier, the terminal, and the pair of pendulum weights are arranged and/or designed such that even in disadvantageous positions of the pairs of pendulum weights the terminal cannot fall out of the respective guide path during operation of the centrifugal pendulum device.

In one embodiment of the invention the terminal, particularly an impact body of the terminal, represents a massive element which is preferably made from plastic. Here, the terminal is preferably embodied in one piece, particularly made in one piece from the same material, and the plastic is preferably a hard and/or wear-resistant plastic. The terminal itself is particularly embodied as an oblong body, with its impact areas for the respective pairs of pendulum weights being aligned essentially parallel in reference to each other in the circumferential direction. In another embodiment of the invention, the terminal is embodied as a spring terminal, which shows in the circumferential direction of the pendulum weight carrier at least one spring device each at its both longitudinal sides. A single spring device of the spring terminal is here preferably embodied as a parallel or serial arrangement of flat springs with one or more steps, where a pair of pendulum weights can abut and/or collide. Here, the terminal is also preferably embodied in one piece, particularly made from the same material throughout, with the terminal preferably being bent into the desired shape from a (punched) blank comprising spring steel.

In preferred embodiments of the invention, a guide path of the pendulum weight carrier, a respective guide path of a pair of pendulum weights, and a corresponding guide element are designed and/or adjusted to each other such that in transitional phases of the respective pair of pendulum weights moving and/or a maximum escaping arc of the centrifugal pendulum device, except for the spring terminals, any mutual collision occurs exclusively between the pairs of pendulum weights, with further preferred a mutual collision of these three components in the circumferential direction being essentially avoided. Preferably here the guide paths of the pendulum weight carrier and/or the pairs of pendulum weights show a clearance angle between the guide elements, the pendulum weight carrier, and/or the pairs of pendulum weights so as to avoid collisions. Further, the terminal is preferably embodied in duplicate for the respective pairs of pendulum weights, with the two elements particularly being fixed to each other via a spacer rivet. The terminal, which can be fastened in the pendulum weight carrier, can be embodied wider in the circumferential direction at one radial exterior longitudinal end section than in a central section or a radially interior end section. A maximum axial depth of an impact area or the spring sections of the terminal is equivalent to that of a pendulum weight; i.e., they are aligned to each other in the circumferential direction.

The invention further relates to a damping device or a torque transmission device, in particular for a drive train or a motor vehicle; for example, a centrifugal pendulum, a torque converter, a clutch, a fluid coupling, a clutch assembly, a damper, a torsional vibration damper, a turbine damper, a pump damper, a dual mass converter, or a dual mass flywheel, or combinations thereof; wherein the damping device or the torque transmission device has a centrifugal pendulum mechanism according to the invention.

BRIEF DESCRIPTION OF THE DRAWINGS

In the following the invention is explained in greater detail based on exemplary embodiments in view of the drawings in which.

DETAILED DESCRIPTION OF THE INVENTION

According to the invention, the respectively explained features may also be applied in the respectively other embodiment and/or variant of the invention; this particularly applies to the embodiments of a respective variant.

In the first embodiment of the first variant of the invention (see FIGS. 1 to 3, and also FIGS. 7 to 10), the damper element 40 according to the invention is embodied as a spring element 42 for a centrifugal pendulum device 1, the spring element 42 in turn is designed as a lamella 42 and/or strip spring element 42, with the spring element 42 in certain situations and/or arrangements acting like a pressure spring element 42. Here, the lamella spring element 42 preferably comprises a thin folded spring blade, which in the circumferential direction U of a pendulum weight carrier 10 of the centrifugal pendulum device 1 is provided between two directly adjacent pendulum weights 22 or pairs of pendulum weights 20 and is here respectively fastened via a fastening section 422. The spring section 424 of the lamella spring element 42 extends between the two fastening sections 422, directly adjacent to each other in the circumferential direction U, which preferably only in certain situations, i.e., at certain relative positions of the pendulum weights 22 and/or pairs of pendulum weights 20 in reference to each other applies an essential spring force between the pendulum weights 22 and/or upon the pairs of pendulum weights 20. In situations different therefrom and/or opposite positions of the pendulum weights 22 and/or pairs of pendulum weights 20, the lamella spring element 42 is embodied elastically and/or soft and/or soft-springy (here see the following).

The equivalent applies preferably to all other pendulum weights 22 and/or pairs of pendulum weights 20 directly adjacent to each other in the circumferential direction U, so that an annular assembly develops of pendulum weights 22 and/or pairs of pendulum weights 20, which are elastically connected and/or fixed to each other via spring elements 42 and/or lamella spring elements 42 in the circumferential direction U. According to the invention, between two pairs of pendulum weights 20, directly adjacent in the circumferential direction U, only a single spring element 42 and/or labella spring element 42 can be provided on only one of the two axial sides of the pendulum weight carrier 10 between the (four) pendulum weights 22, with only two pendulum weights 22, adjacent in the circumferential direction U, are directly elastically connected via the spring element 42 and/or lamella spring element 42. Of course it is also possible to provide spring elements 42 and/or lamella spring elements 42 at both axial sides of the pendulum weight carrier 10, which is preferred. The latter is illustrated in the exemplary embodiments according to FIGS. 1 to 3 for the first embodiment and FIGS. 4 and 5 for the second embodiment (see below). The first and also the latter are shown in the drawing according to FIGS. 7 to 10. Here, it is possible to provide the spring elements 42 and/or lamella spring elements 42 at opposite sides. Further, it is possible, instead of pairs of pendulum weights 20, to provide only pendulum weights 22 on one axial side of the pendulum weight carrier 10, which is also shown in FIGS. 7 to 10. In the following essentially only one pendulum weight 22 and/or respective pendulum weights 22 are discussed, i.e., pendulum weights 22 directly adjacent in the circumferential direction U of the pendulum weight carrier 10. However, the statements made in the following shall also apply equivalently to pairs of pendulum weights 20 and/or the remaining pendulum weights 22 and/or pairs of pendulum weights 20, as well as the here presented embodiments of the invention.

Figure 8:
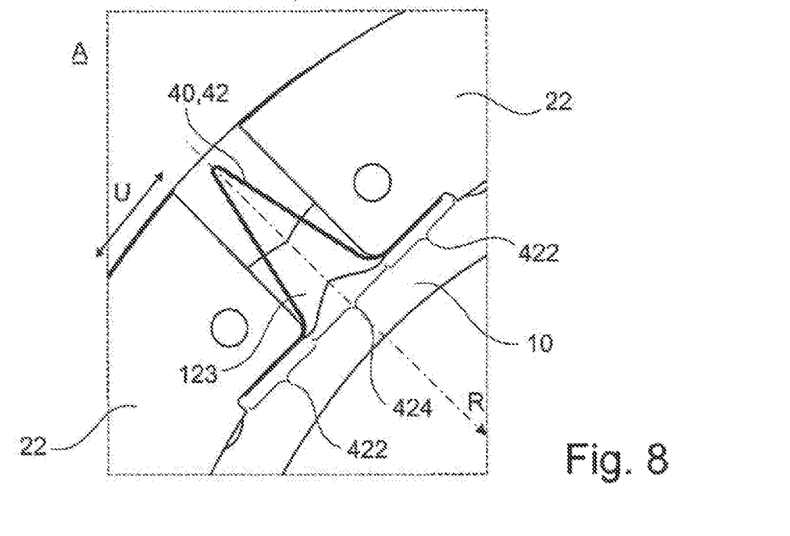
Figure 9:
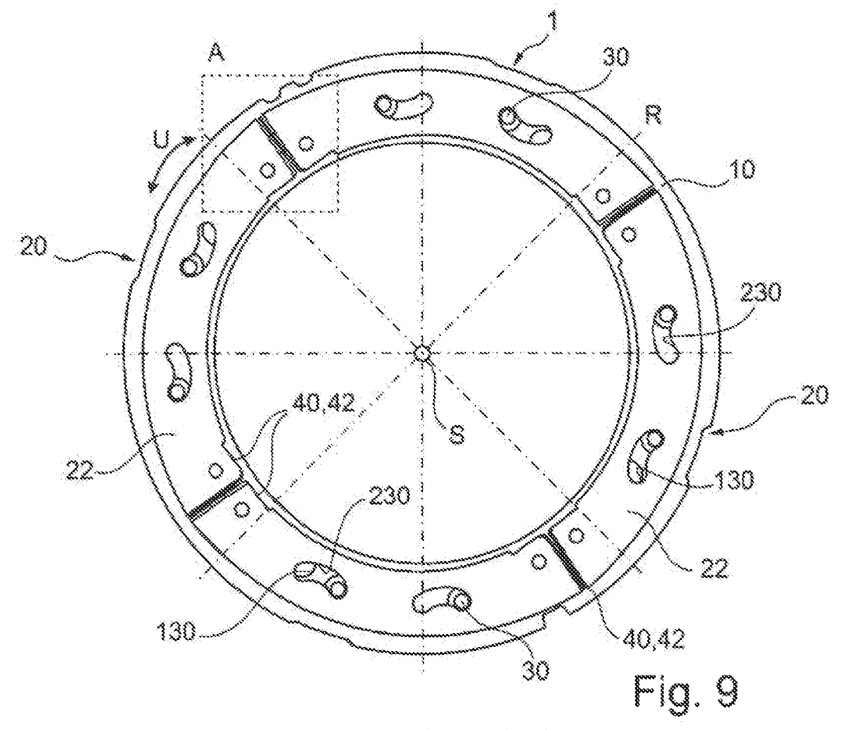
Figure 10:
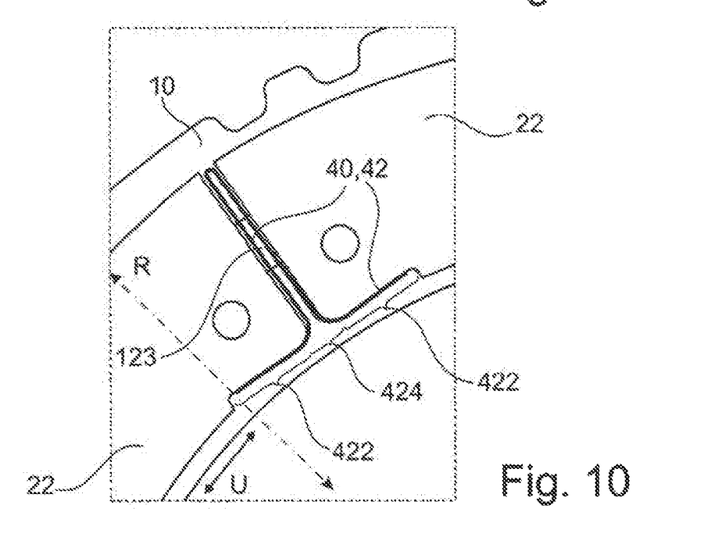
Figure 11:
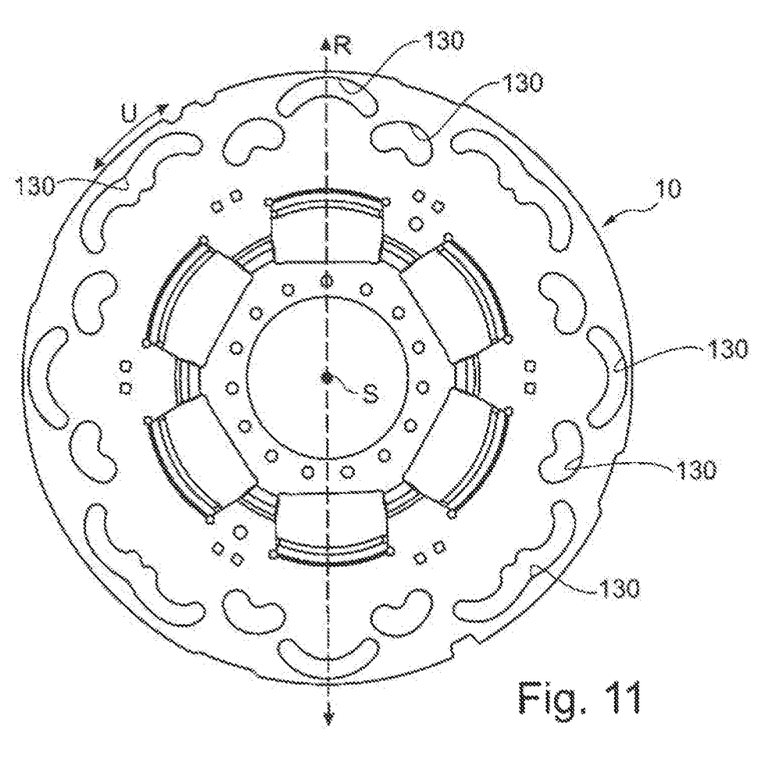
FIG. 11 illustrates a pendulum weight carrier for the second variant of the invention.
Figure 12:
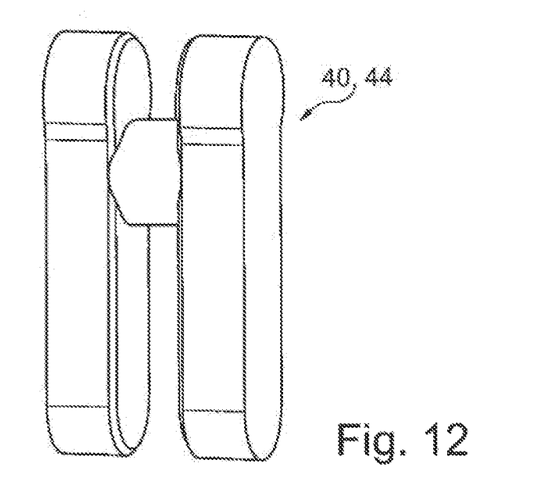
FIG. 12 illustrates a first embodiment of a second variant of a damper element according to the invention, with the damper element being embodied as a terminal.

An individual fastening range 422 of the lamella spring element 42 preferably comprises a flat flap, which particularly contacts flat at a radial side of a pendulum weight 22 and is fastened via a pin and/or a rivet at/in the pendulum weight 22, with the pendulum weight 22 here preferably showing a fastening recess for this purpose (see FIGS. 8 and 10). Here, the pendulum weight 22 may show at the radial side a flat recess corresponding to the fastening section 422, in which the fastening section 422 can be accepted such that it is aligned thereto at least with a radial area of the pendulum weight 22 (not shown in the drawing). For the assembly at the axially opposite pendulum weight 22 of a pair of pendulum weights 20, the fastening section 422 (see FIGS. 2 and 3) opposite the first pendulum weight 22 may show a pin 423, such as a rivet 423 or a spacer bolt 423, which extends through the pendulum weight carrier 10 into a fastening recess in the axially adjacent pendulum weight 22 and is here fastened (see FIGS. 7 to 10). Further, the respective fastening section 422 of the axially adjacent lamella spring element 42 comprises for this purpose also preferably a penetrating recess, in which the pin 423 is also fixed. For the rest, this second lamella spring element 42 is designed like the first one. The same process is used for the other pendulum weight 22 directly adjacent in the circumferential direction U.

If pairs of pendulum weights 20 are used, it is preferred that the pin/pins 423 extending through the pendulum weight carrier 10 is/are not guided therein (see FIGS. 8 and 9). This means that the pendulum weight carrier 10 is recessed in this area such that the pin 423 in essentially all of its positions shows in later operation of the centrifugal pendulum device 1 no contacting impact with the pendulum weight carrier 10. For this purpose the respective penetrating recess 123 in the pendulum weight carrier 10 shows, e.g., a respective clearance angle. The pin 423 shows only the pendulum weights 22 of a pair of pendulum weights 20 on an opposite axial distance. Further, it is preferred that the fastening section 422 encompasses the respective pendulum weights 22 at a radial end at the outside or inside, and for this purpose analogue to the above statements once more a recess may be provided in the respective pendulum weight 22. Here, then the spring section 424 is mechanically connected in the circumferential direction U to the section of the lamella spring element 42 encompassing the radial end. Furthermore, the respective pendulum weights 22 may be embodied such that the lamella spring element 42 is provided radially outside (see FIG. 2) or radially inside (see FIG. 3) between the pendulum weights 22.

Figure 1:
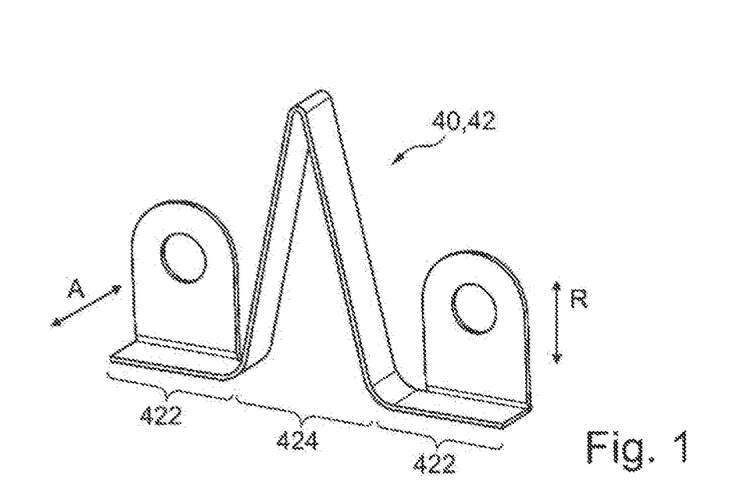
FIGS. 1 to 3 illustrate a first exemplary embodiment of a first variant for a centrifugal pendulum device according to the invention, whereby a circumferential direction between two directly adjacent pendulum weights a damper element is provided embodied according to the invention as a simple lamella spring element.
Figure 2:
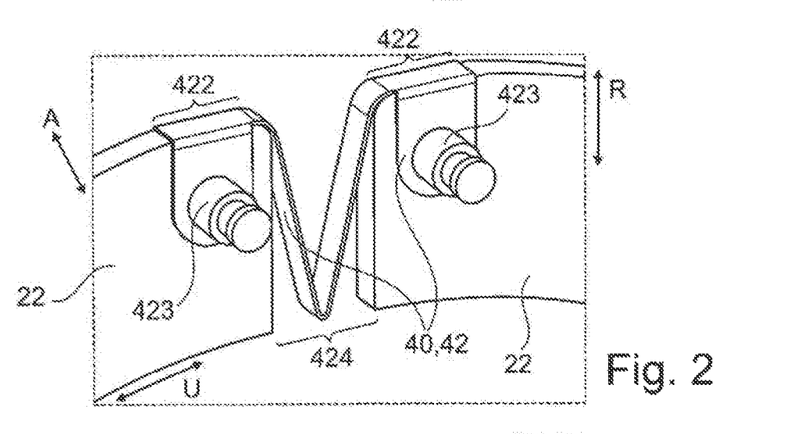
Figure 3:
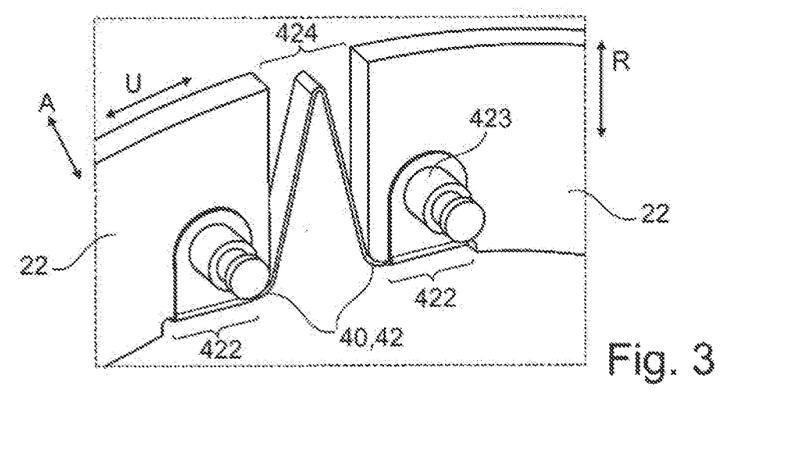

The spring section 424 of the lamella spring elements 42 comprises at least one spring path in a spring, which provides a spring force between the respective pendulum weights 22. This spring path may be a zigzag, a curved, or a triangular path; of course other forms are possible as well. Here, preferred is, e.g., at least a single zigzag or triangular path as shown in FIGS. 1 to 3 and in FIGS. 7 to 10. This means the two fastening sections 422 of the lamella spring element 42 are radially fastened at the respective pendulum weight 22 at the same height, with the spring section 424 extending between these pendulum weights 22 in the radial direction R and in the circumferential direction U. As shown, e.g., in FIG. 2, the spring section 424 extends, starting at a pendulum weight 22, with one leg first in the radial direction R inwardly and approximately at half the distance between the respective pendulum weights 22 after a reversal point (bend, arch with small radius) in the radial direction R with another leg back outwardly. FIG. 3 shows an inverse example. Of course it is also possible to apply a plurality of such spring paths. A stiffness of the spring section 424 can perhaps be adjusted by a length, a quantity, and/or a material of said legs.

According to the invention the lamella spring element 42 may be designed such that at certain relative motions between the respective pendulum weights 22 it is embodied soft-springy, i.e., elastic, and at certain other relative motions between the respective pendulum weights 22 hard-springy, i.e., spring-like. The first (option) is preferred when the respective pendulum weights 22 are relatively far apart from each other in the circumferential direction U iii (see FIGS. 7 and 8). The latter e.g., when the respective pendulum weights 22 are arranged comparatively close together (see FIGS. 9 and 10). Thus, in the radial direction R the lamella spring element 42 is preferably essentially soft-springy and in particular essentially in the circumferential direction U, except for the spring section 424, also preferably embodied soft-springy. Of course, the spring of the lamella spring element 42 is essentially embodied spring-like, thus hard-springy essentially in the circumferential direction U. In preferred exemplary embodiments at least one or a respective connection of the spring section 424 and/or the spring is embodied elastic at the respective fastening section 422, i.e., soft-springy. This way, respective pendulum weights 22 can move in reference to each other over a wide range without this motion being significantly influenced by the lamella spring elements 42. Only if the respective pendulum weights 22 come close to each other, which is the case, e.g., when one leg of the spring of the spring section 424 with its longitudinal extension contacts a face of a pendulum weight 22 in the circumferential direction U; only in such a case the lamella spring element 42 begins to apply a significant force between the two pendulum weights 22. Further, it is preferred that the lamella spring element 42 is embodied hard-springy in the axial direction A, so that here collisions can be avoided between the pendulum weights 22 and the pendulum weight carrier 10.

Figure 4:
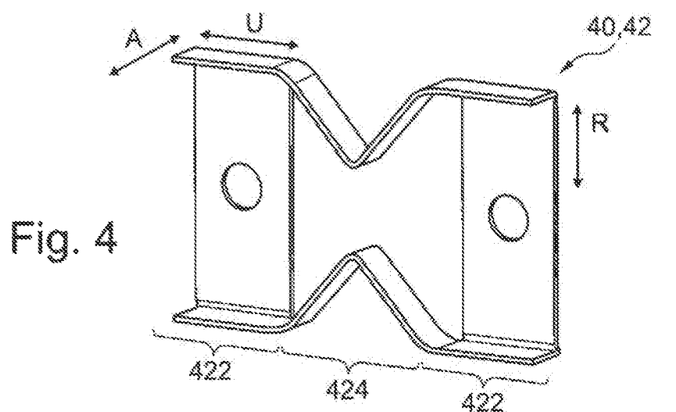
FIGS. 4 and 5 illustrate a second embodiment of the first variant of the invention, with between respective pendulum weights a damper element being provided embodied as a double-sided lamella spring element.
Figure 5:
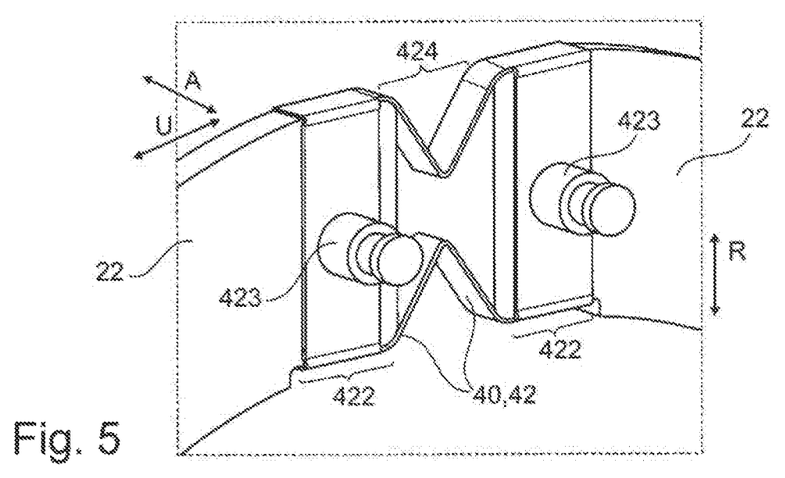
Figure 6:
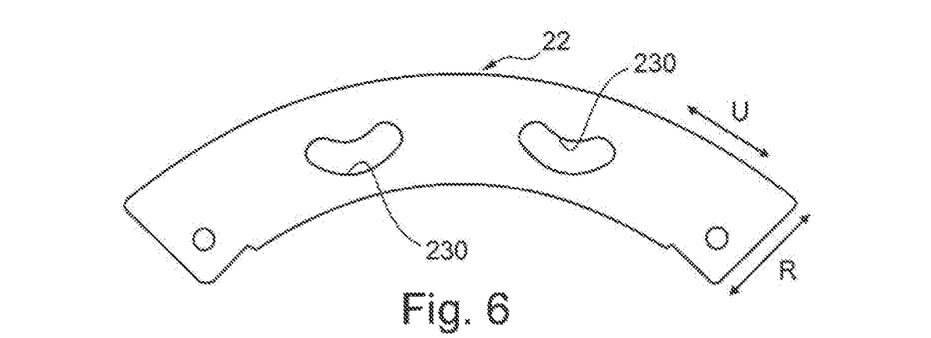
FIG. 6 illustrates a single pendulum weight.
Figure 7:
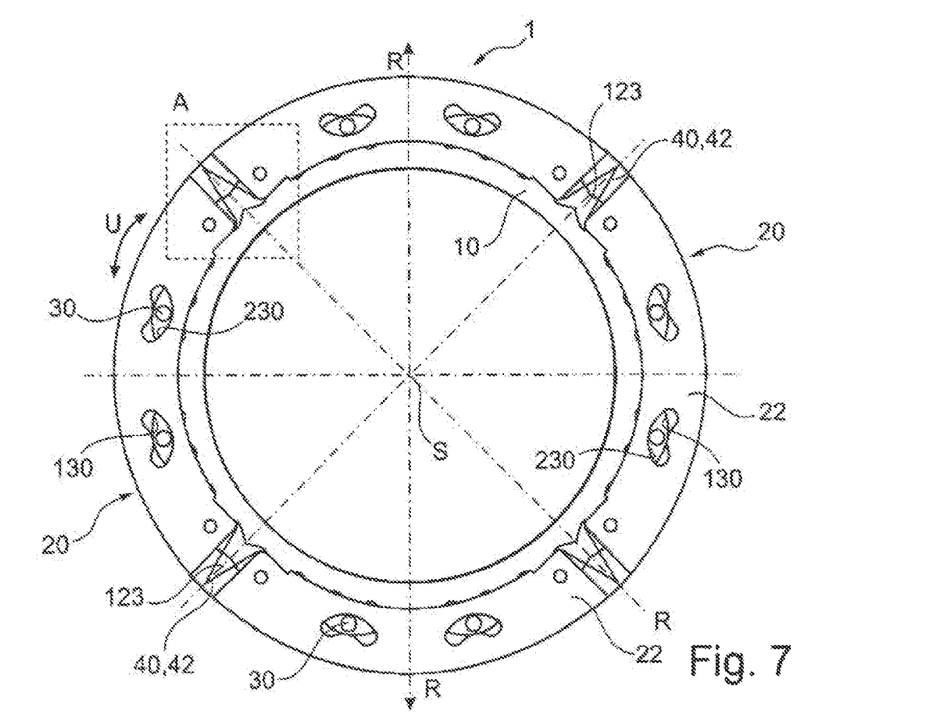
FIGS. 7 to 10 illustrate two relatively stable extreme positions of the centrifugal pendulum device according to the invention as in the first embodiment of the first variant in a minimal (FIGS. 7 and 8) and a maximal escaping arc (FIGS. 9 and 10)

FIGS. 4 and 5 show the second embodiment of the first variant of the invention. This is designed analogue to the first embodiment, whereby in the spring section 424 of the lamella spring element 42 two springs are provided with one spring path each, opposite each other i.e., separated in the radial direction R. Further, the respective fastening range 422 for the respective pendulum weight 22 extends entirely along the radial direction R of the pendulum weight 22 and encompasses it preferably at both radial ends in the axial and the circumferential direction. The two separate springs of the spring section 424 then follow the encompassed sections of the fastening section 422 first in the circumferential direction U and then each approach in the direction of a radial center in the circumferential direction between the respective pendulum weights 22. Before the separated springs contact, they extend each in an opposite direction and approach the respectively other fastening section 422. Further, the features of the first embodiment can be applied to the second embodiment and vice versa. According to the invention, spring elements 42 can be applied, which are fastened radially inside at one pendulum weight 22 and radially outside at the respectively other one, with then the spring section 424 extending diagonally between these fastenings; here the connections of the spring section 424 to the fastenings are preferably embodied hard-springy (not shown in the drawing).

In order to guide the pendulum weights 22 at/in the pendulum weight carrier 10, both the pendulum weight carrier 10 and the pendulum weights 22 preferably comprise oppositely curved guide paths 130, 230, in which guide elements 30 guide the pendulum weights 22 articulate at the pendulum weight carrier 10 depending on a rotation of the pendulum weight carrier 10 about a rotary axis S. According to the invention, in both embodiments of the first variant the guide paths 130, 230 may be designed such that no hard impacts and/or shocks of the guide elements 30 at a respectively inner longitudinal end of the guide paths 130, 230 occur in the pendulum weight carrier 10 and/or in the pendulum weight 20. For this purpose, the guide paths 130, 230 show a respective clearance angle and/or an expansion, which extends the guide path or paths 130, 230 such that before a guide element 30 impacts at a longitudinal end of the respective guide path 130, 230 respective pendulum weights 22 have approached each other maximally, as shown e.g., in FIGS. 9 and 10, and preferably no other essentially impact-like displacement of the guide element 30 occurs in the guide path 130, 230. In a maximal deflection, the respective pendulum weights 22 laterally fold together in the circumferential direction U such that, except for the lamella spring element 42, any further collision occurs between the pendulum weights 22 and not between a pendulum weight 22, a respective guide element 30, and/or the pendulum weight flange 10. The guide element 30 may be embodied, e.g., as a rolling element 30, a cylinder roll 30, a glide element 30, a rivet 30, or a pin 30.

According to a first variant of the invention, a centrifugal pendulum device 1 and/or a centrifugal pendulum is provided, with its pendulum weights 22 being mechanically coupled and/or connected to each other in an elastic fashion via spring elements 42, particularly flat springs 42, with the guide paths 130, 230 for the guide elements 30 showing a clearance angle for the purpose of reducing noise and shock absorption in the pendulum carrier 10 and/or in the pendulum weights 20, as well as penetrating recesses 123 in the pendulum weight carrier 10 for the pins 423 of the spring elements 42.

In the first embodiment of the second variant of the invention (see FIGS. 11 to 16), the damper element 40 according to the invention for the centrifugal pendulum device 1 is embodied as a terminal 44 and/or an impact buffer 44. Here, the terminal 44 preferably comprises a massive element, which is made particularly from a hard and/or a wear-resistant plastic, which is provided in the circumferential direction U of the pendulum weight carrier 10 between two directly adjacent pendulum weights 22 or pairs of pendulum weights 20. The terminal 44 is here suspended in a guide path 130 of the pendulum weight carrier 10, in which preferably also a pendulum weight 22 and/or a pair of pendulum weights 22 is guided. During operation of the centrifugal pendulum device 1, the respective pendulum weight 22 or the respective pair of pendulum weights 20 can impact the terminal 44. Preferably, in the guide path 130 directly neighboring each other, thus respective pendulum weights 22 or pairs of pendulum weights 20 are supported with the terminal 44 also being provided between these two in this guide path 130. The terminal 44 is embodied such that in a simultaneous direct contacting of respective pendulum weights 22 or pairs of pendulum weights 20 they cannot directly collide with each other in the circumferential direction U. In the transitional phases of the centrifugal pendulum device 1 as well as in a maximum deflection (see FIG. 16) of the pendulum weights 22 or the pairs of pendulum weights 20 any collisions between them is effectively prevented. Similar to the statements made above, in the following once more only one axial side of the pendulum weight flange 10 is referenced, with these statements may also relate analogue to the second axial side.

The terminal 44 is embodied on an axial side of the pendulum weight carrier 10 as an oblong body, which is preferably rounded at the longitudinal end sections. Here, a radially exterior longitudinal end section can be embodied widened in the circumferential direction U. A cross-section of this body is designed in a central section preferably essentially square or rectangular, with the two impact sides located in the circumferential direction U, which the pendulum weights 22 can impact, being preferably located essentially parallel in reference to each other. They may also include a small angle, which is equivalent to the one assumed by the faces of the respective pendulum weights 22 in a mutual contact. The terminal 44 is suspended with a cylinder section, projecting from the body essentially at a right angle, in the guide path 130, with, at the axial side of the pendulum weight carrier 10 opposite the first oblong body preferably a second essentially identical oblong body follows, which is also provided at the cylinder section. Here, the cylinder section is arranged off-set in reference to a longitudinal end of an terminal 44, so that a longer section extends radially inwardly at the pendulum weight carrier 10 (see FIGS. 14 and 15), however it may of course also be embodied such that the cylinder section is arranged centrally or adjacent to the other longitudinal end of the terminal 44.

Figure 13:
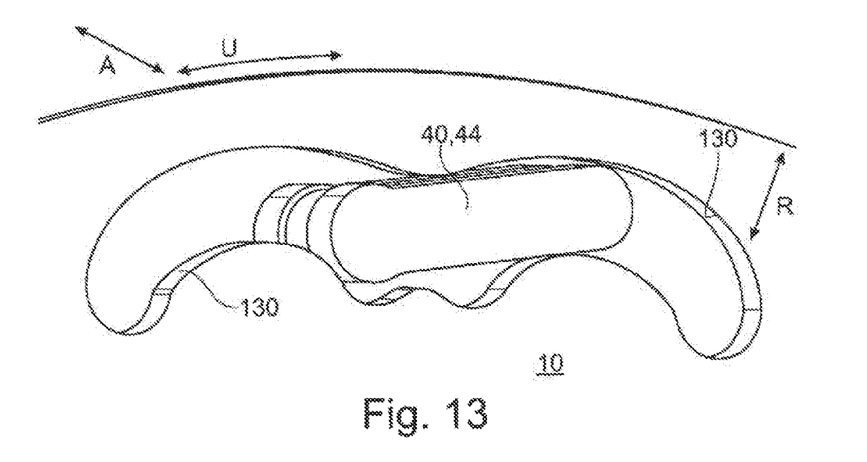
FIGS. 13 and 14 illustrate a suspension of the terminal of FIG. 12 in the pendulum weight carrier of FIG. 11.
Figure 14:
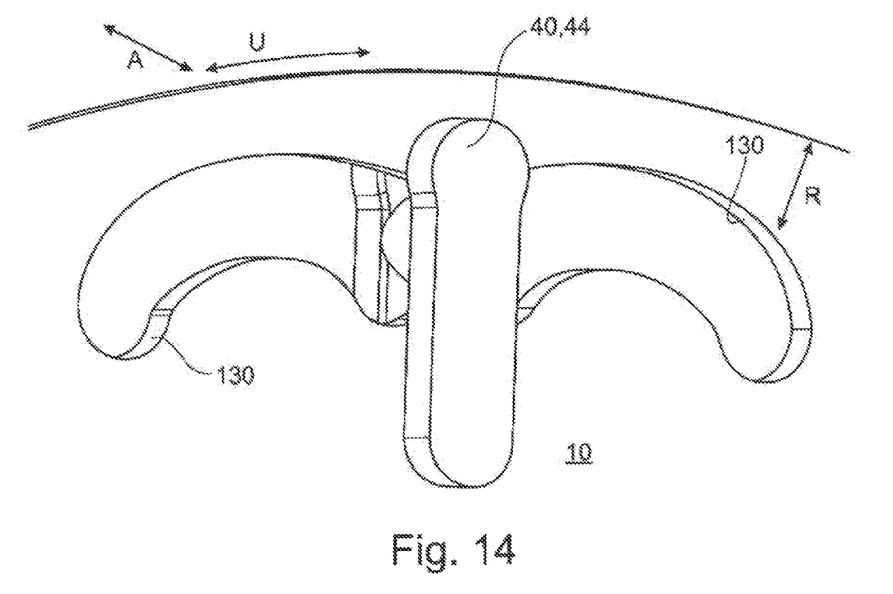
Figure 15:
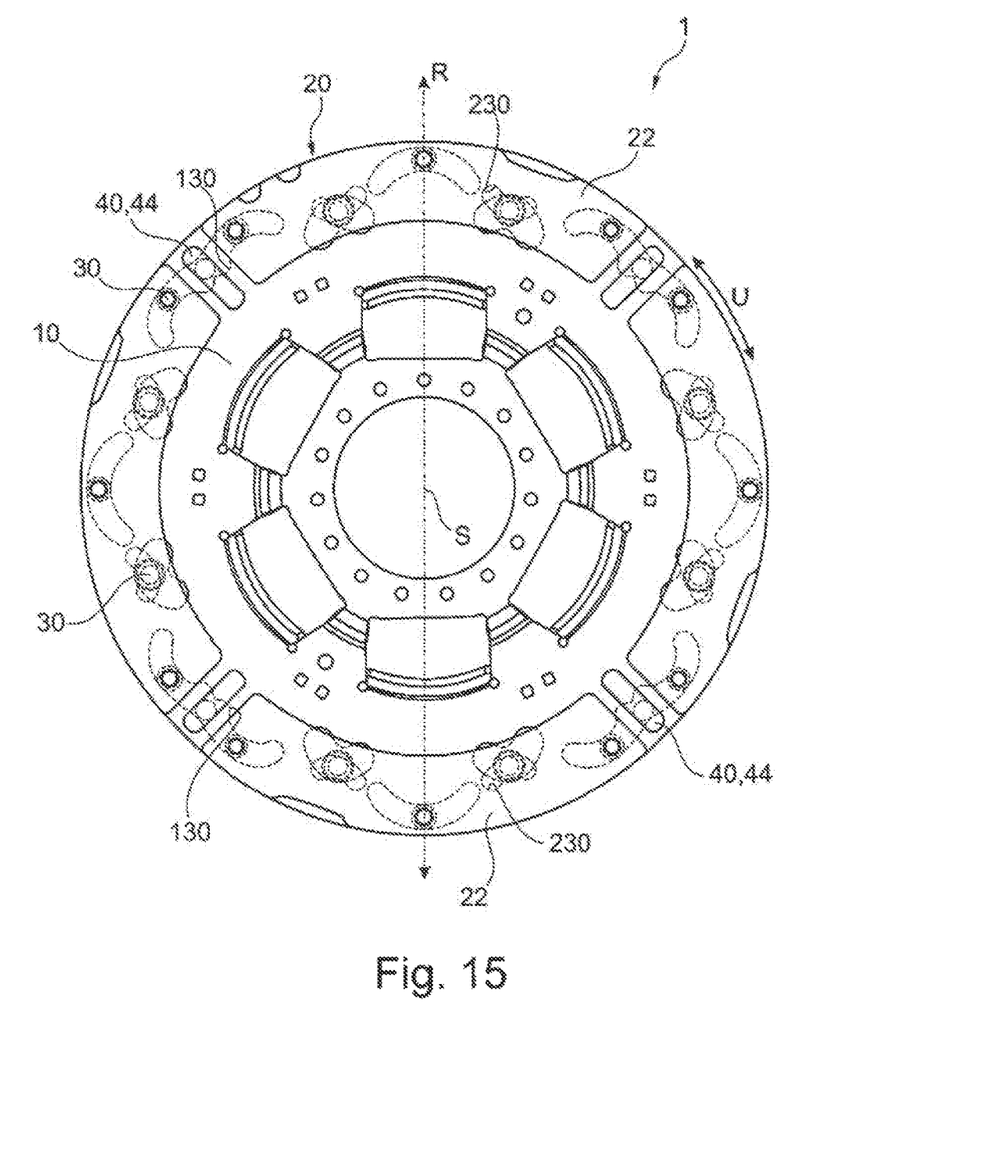
FIGS. 15 and 16 illustrate two relatively stable extreme positions of the centrifugal pendulum device according to the invention as in the first embodiment of the second variant in a minimal and (FIG. 15) a maximal escaping arc (FIG. 16); and, FIGS. 17 to 21 illustrate two embodiments of the second variant of the damper element according to the invention, with the damper element respectively being embodied as a spring terminal.

In preferred embodiments of the invention, the terminal 44 is configured such that its largest radial cross-section can be included in a cross-section of the guide path 130, which is illustrated in FIG. 13. This way, the terminal 44 can easily be suspended in the guide path 130. In a temporal succession thereto the pendulum weights 22 are provided, which constrict in all positions of the centrifugal pendulum device 1 the remaining space for the terminal 44 such that it cannot be falling out of the guide path 130. In a side view of the terminal 44 according to the invention for pairs of pendulum weights 20, it essentially shows the form 'H', with a bar being arranged between the two legs of the 'H' offset towards a center of the legs (see FIG. 12). Within the guide path 130 the respective terminal 44 can move oscillating along the guide path 130.

Figure 17:
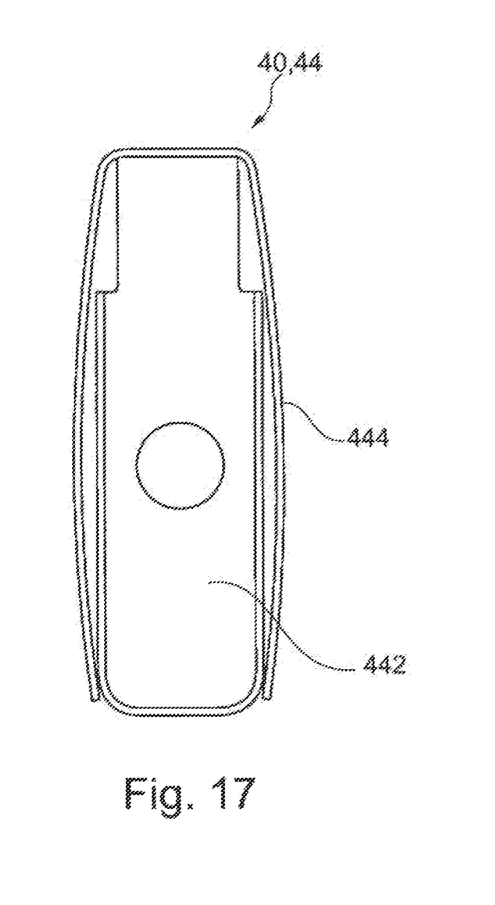
Figure 18:
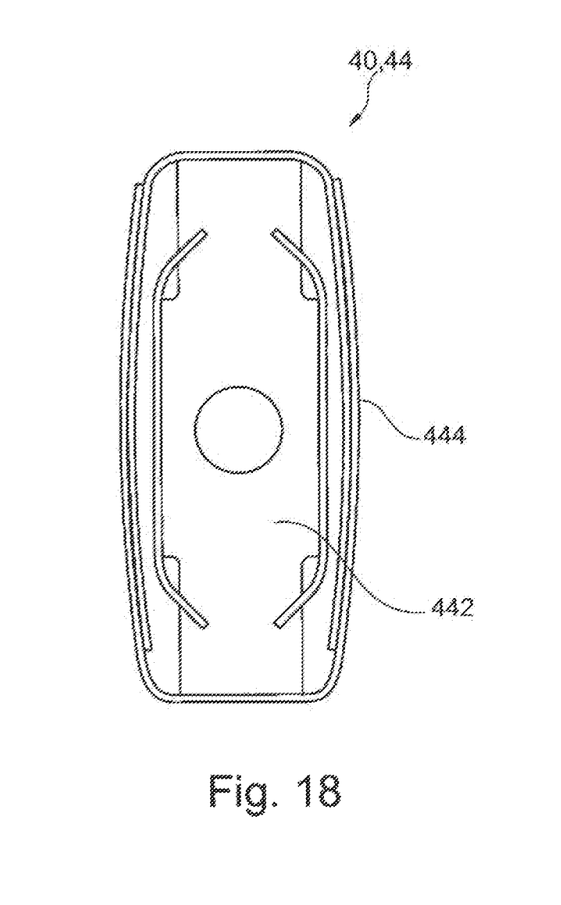
Figure 19:
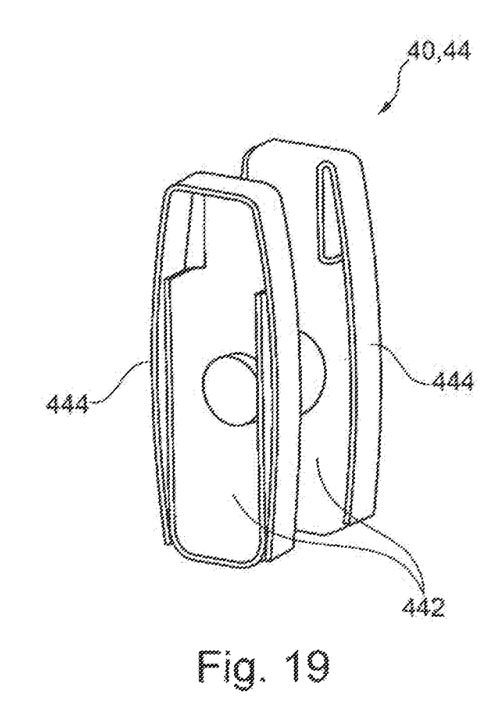
Figure 20:
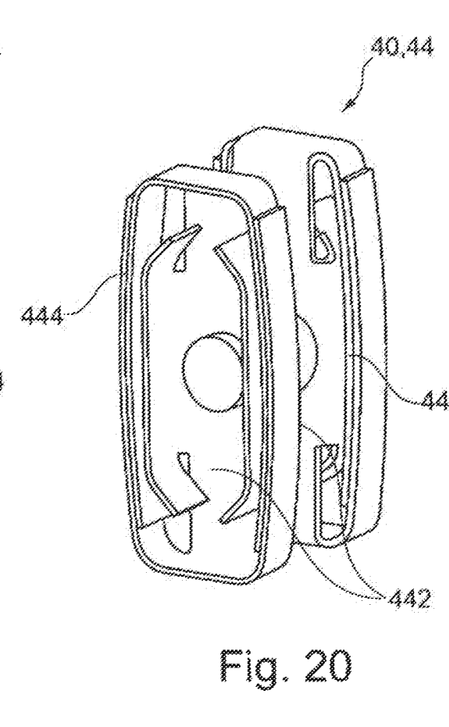
Figure 21:
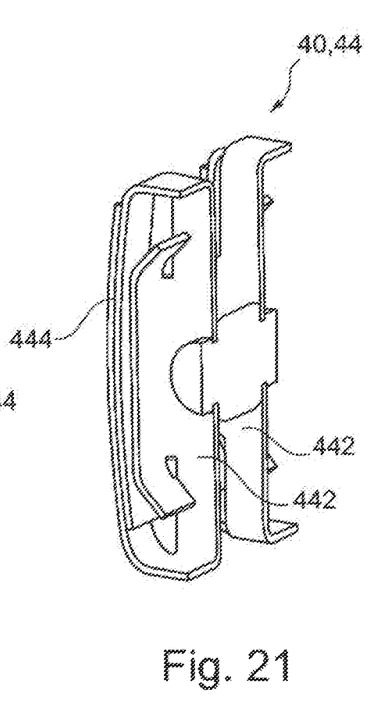

In the second embodiment of the second variant of the invention (see FIGS. 17 to 21) the damper element 40 according to the invention is realized for the centrifugal pendulum device 1 as a spring terminal 44. Here, once more a single body can be used for the respective pendulum weight 22 or two bodies for pairs of pendulum weights 20 can be used analogue to the statements two above. In the latter case, two bodies and/or halves (FIGS. 19 to 22) preferably formed from a spring steel, e.g., by way of riveting with a spacer rivet, are fastened together to form a unit. Here, a body shows preferably spring devices 444 on both sides in the circumferential direction U, so that collisions can be prevented between respective pendulum weights 22. The spring devices 444 are located laterally at a basic body 442 of the spring terminal 44 parallel in reference to the radial side of the pendulum weight carrier 10, with the spring devices 444 at both circumferential sides being bent away at a right angle. Here, the flat sides of the spring devices 444 extend in the radial direction R (and/or the) axial direction A. An individual spring device 444 is particularly embodied at least as a spring arm 444 or a spring bar 444, which can be supported at a flap projecting essentially perpendicular from the basic body 442. Here, a spring device 444 may be embodied as a one-stage (FIGS. 17 and 19) or a multi-stage flat spring (FIGS. 18, 20 and 21).

Figure 16:
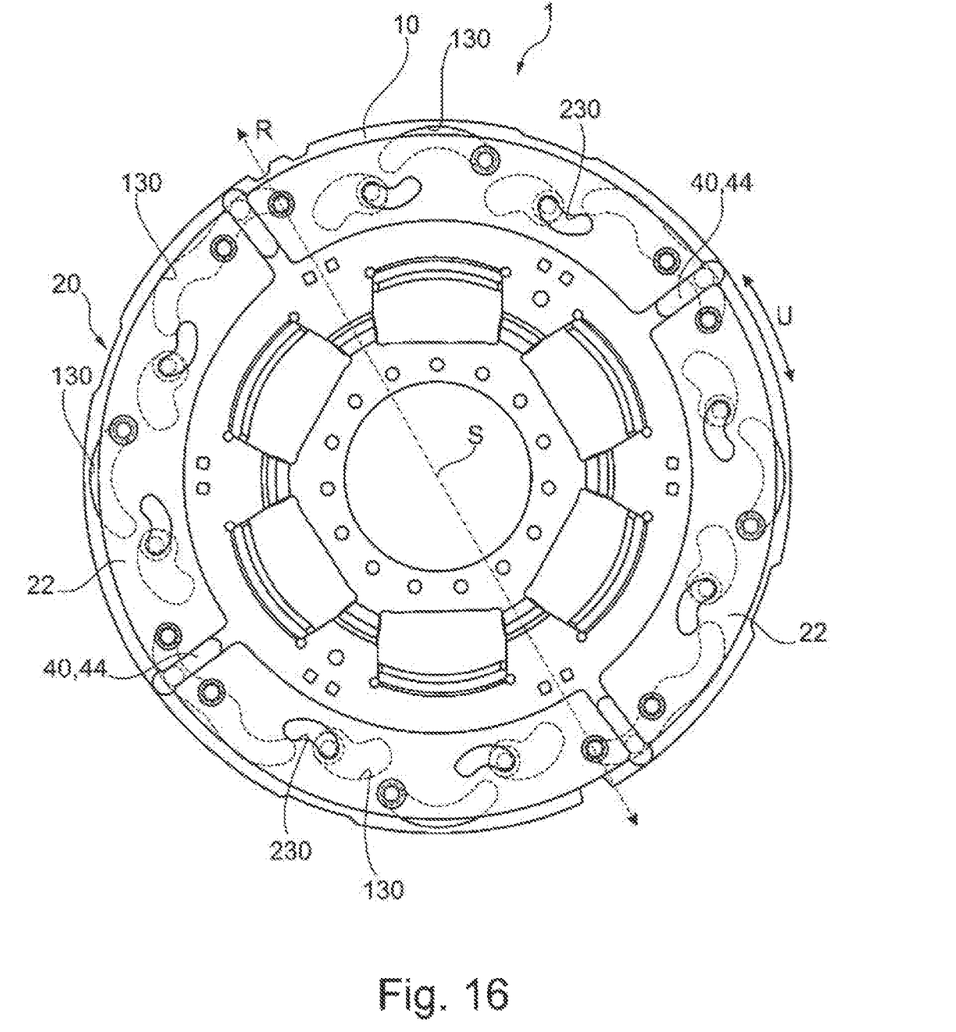

According to the invention, in the two embodiments of the second variant, the guide paths 130, 230 may be embodied such that no hard collisions and/or contacts occur of the guide element 30 at a respectively inner longitudinal end of the guide paths 130, 230 in the pendulum weight carrier 10 and/or in the pendulum weight 20. For this purpose, the guide paths 130, 230 show a respective clearance angle and/or an expansion, which extends the guide path or paths 130, 230 such that before a guide element 30 impacts a longitudinal end of the respective guide path 130, 230 respective pendulum weights 22, as shown in FIG. 16, have maximally approached each other and no additional impact-like displacement of the guide element 30 occurs in the guide path 130, 230. In a maximal deflection, e.g., in a run under load, the pendulum weights 22 laterally fold together so that further the collision of the pendulum weights 22 occurs at both sides of the respective terminal 44 and not between a respective pendulum weight 22, a respective guide element 30, and/or the pendulum weight flange 10.

According to the second variant of the invention, a centrifugal pendulum device 1 and/or a centrifugal pendulum is provided, whereby their pendulum weights 22 can be supported via terminal 44 against each other and/or the guide paths 130, 230 each show a clearance angle for the purpose of noise reduction and shock absorption for the guide elements 30 in the pendulum weight carrier 10 and in the pendulum weights 20.

REFERENCE VARIABLES

1 Centrifugal pendulum device, particularly trapeze centrifugal pendulum device; device for a rotationally adaptive vibration damping
10 Pendulum weight carrier, pendulum flange
20 Pair of pendulum weights, pair of compensation weights, pair of inertia weights
22 Individual pendulum weight, individual compensation weight, individual inertia weight
30 Guide element, particularly roller element, cylinder roll, gliding element, rivet, pin
40 Damper element, shock absorber
42 Spring element, pressure spring element, lamella spring (element), strip spring (element)
44 Terminal, Impact buffer, particularly massive element (plastic) or spring terminal (metal and/or metal alloy)
123 Penetrating recess for pin 123 of the fastening section 422
130 Guide path for guide element 30 and perhaps terminal 44 at the pendulum weight carrier 10
230 Guide path for guide element 30 in the pendulum weight 20
422 Fastening section
423 Pin, rivet, spacer rivet, spacer bolt
424 Spring section
442 Basic body
444 Spring device, particularly spring arm, spring bar
A Axial direction of the centrifugal pendulum device 1, the pendulum weight carrier 10, the pair of pendulum weights 29, etc.
R Radial direction of the centrifugal pendulum device 1, the pendulum weight carrier 10, the pair of pendulum weights 20, etc.
S Rotary axis of the centrifugal pendulum device 1
U Circumferential direction of the centrifugal pendulum device 1, the pendulum weight carrier 10, the pair of pendulum weights 20, etc.

What is claimed is:

1. A centrifugal pendulum device for a drivetrain of a motor vehicle, comprising:
a pendulum weight carrier rotatable about a rotary axis and including:
first and second pluralities of guide paths; and,
first and second axial sides;
a first pendulum weight located on the first axial side and including a third plurality of guide paths;
a second pendulum weight:
located on the first axial side;
adjacent to the first pendulum weight in a first circumferential direction; and,
including a fourth plurality of guide paths;
first and second guide elements:
disposed in respective guide paths included in the first and third pluralities of guide paths; and,
displaceable within the respective guide paths included in the first and third pluralities of guide paths;
third and fourth guide elements:
disposed in respective guide paths included in the first and fourth pluralities of guide paths; and,
displaceable within the respective guide paths included in the first and fourth pluralities of guide paths;
a first lamella spring element disposed between the first and second pendulum weights in the first circumferential direction;
a first pin:
connecting the first lamella spring element to the first pendulum weight;

passing through a first guide path included in the second plurality of guide paths; and,
displaceable within the first guide path; and,
a second pin:
connecting the first lamella spring element to the second pendulum weight;
passing through the first guide path; and,
displaceable within the first guide path, wherein the first and second pendulum masses are displaceable with respect to the pendulum weight carrier.

2. The centrifugal pendulum device of claim 1, further comprising:
a third pendulum weight:
located on the second axial side;
adjacent to the first axial weight in an axial direction; and,
including a fifth plurality of guide paths; and,
a fourth pendulum weight:
located on the second axial side;
adjacent to the second axial weight in the axial direction; and,
including a sixth plurality of guide paths, wherein:
the first pin connects the first lamella spring element to the third pendulum weight;
the second pin connects the first lamella spring element to the fourth pendulum weight; and,
the third and fourth pendulum masses are displaceable with respect to the pendulum weight carrier.

3. The centrifugal pendulum device of claim 1, wherein:
the first and second pendulum weights are displaceable with respect to each other;
each guide path in the first plurality of guide paths includes respective longitudinal ends; and,
for displacement of the first and second pendulum weights toward each other, the first lamella spring element is arranged to compress to prevent contact of the first, second, third, and fourth guide elements with the respective longitudinal ends.

4. The centrifugal pendulum device of claim 1, wherein:
the first and second pendulum weights are displaceable with respect to each other;
each guide path in the third plurality of guide paths includes respective longitudinal ends; and,
for displacement of the first and second pendulum weights toward each other, the first lamella spring element is arranged to compress to prevent contact of the first and second guide elements with the respective longitudinal ends.

5. The centrifugal pendulum device of claim 1, wherein:
the first and second pendulum weights are displaceable with respect to each other;
each guide path in the fourth plurality of guide paths includes respective longitudinal ends; and,
for displacement of the first and second pendulum weights toward each other, the first lamella spring element is arranged to compress to prevent contact of the third and fourth guide elements with the respective longitudinal ends.

6. The centrifugal pendulum device of claim 1, wherein:
the first and second pendulum weights are displaceable with respect to each other;
each guide path in the second plurality of guide paths includes respective longitudinal ends; and,
for displacement of the first and second pendulum weights toward each other, the first lamella spring element is arranged to compress to prevent contact of the first pin with the respective longitudinal ends.

7. The centrifugal pendulum device of claim 1, wherein:
the first and second pendulum weights are displaceable with respect to each other; and,
the first lamella spring element:
has a first spring coefficient in a radial direction and in the circumferential direction; and,
has a second spring coefficient, greater than the first spring coefficient, in an axial direction.

* * * * *